US012224490B2

(12) United States Patent
Kim et al.

(10) Patent No.: US 12,224,490 B2
(45) Date of Patent: Feb. 11, 2025

(54) HORN ANTENNA FOR MILLIMETER WAVE

(71) Applicant: SENSORVIEW CO., LTD., Seongnam-si (KR)

(72) Inventors: Byoung Nam Kim, Suwon-si (KR); Hong Il Yoo, Gwangmyeong-si (KR); Chul-Keun Park, Seongnam-si (KR); Chan-Woo Park, Seoul (KR); Kyung Hwan Kim, Anyang-si (KR)

(73) Assignee: SENSORVIEW CO., LTD., Seongnam-si (KR)

( * ) Notice: Subject to any disclaimer, the term of this patent is extended or adjusted under 35 U.S.C. 154(b) by 0 days.

(21) Appl. No.: 18/171,725

(22) Filed: Feb. 21, 2023

(65) Prior Publication Data

US 2023/0282983 A1 Sep. 7, 2023

(30) Foreign Application Priority Data

Feb. 24, 2022 (KR) ........................ 10-2022-0024188

(51) Int. Cl.
*H01Q 13/02* (2006.01)
*H01P 5/107* (2006.01)
*H01Q 21/00* (2006.01)

(52) U.S. Cl.
CPC ......... *H01Q 13/0233* (2013.01); *H01P 5/107* (2013.01); *H01Q 21/0062* (2013.01)

(58) Field of Classification Search
CPC ........... H01Q 13/0233; H01Q 21/0062; H01Q 13/02; H01P 5/107
See application file for complete search history.

(56) References Cited

U.S. PATENT DOCUMENTS

| | | | | |
|---|---|---|---|---|
| 9,525,206 B2 * | 12/2016 | Abe | ................... | H01Q 21/0037 |
| 2002/0027528 A1 * | 3/2002 | Okabe | .................. | H01Q 13/106 343/702 |
| 2016/0164189 A1 * | 6/2016 | Jafarlou | ................. | H01Q 13/02 29/601 |

FOREIGN PATENT DOCUMENTS

| | | | | |
|---|---|---|---|---|
| KR | 10-2010-0109151 A | 10/2010 | | |
| KR | 101496302 B1 * | 3/2015 | ................ | H01P 7/10 |
| KR | 10-2016-0121980 A | 10/2016 | | |
| KR | 10-2019-0074126 A | 6/2019 | | |
| KR | 10-2020-0040403 A | 4/2020 | | |

* cited by examiner

*Primary Examiner* — Dimary S Lopez Cruz
*Assistant Examiner* — Austin M Back

(57) ABSTRACT

A horn antenna for a millimeter wave comprises: a horn radiator including a radiation part having an opening formed therein to radiate a feed signal, and a multi-layer PCB coupling part coupled to lower and side portions of the radiation part to provide a feed signal; and a multi-layer PCB coupled to a lower portion of the multi-layer PCB coupling part to provide a feed signal, wherein a slot and a groove connected to the slot and extending in a direction parallel to the multi-layer PCB are formed in the multi-layer PCB coupling part, wherein a feed line vertically overlapping the slot and the groove is formed on a first layer substrate, which is the uppermost layer of the multi-layer PCB, wherein the opening extends in a direction parallel to the multi-layer PCB, and wherein a '¬'-shaped waveguide extending from the slot is formed in the horn radiator.

3 Claims, 9 Drawing Sheets

HORN ANTENNA FOR MILLIMETER WAVE

CROSS-REFERENCE TO RELATED APPLICATIONS

This application claims priority under 35 U.S.C. § 119(a) to Korean Patent Application No. 10-2022-0024188, filed on Feb. 24, 2022, with the Korean Intellectual Property Office, the disclosure of which is incorporated herein in its entirety by reference.

BACKGROUND

1. Technical Field

The present disclosure relates to a horn antenna, and more particularly to a horn antenna for a millimeter wave.

2. Description of the Related Art

In recent years, 5G communication has been started, in which 5G performs communication using a millimeter wave band of 20 GHz or more compared to the existing 4G communication. The millimeter wave band has a very large attenuation characteristic compared to the low frequency band, and the signal loss due to an obstacle is very large.

In the 5G band, very large-capacity IoT data, 360-degree video data, VR data, and various types of big data are supported through mobile communication networks, and for this reason, communication using the millimeter wave band is essential.

However, in the millimeter wave band, due to attenuation characteristics and dissipation characteristics, there was a problem in that it was difficult to perform proper communication with a conventionally used antenna structure. Antennas for the millimeter wave band need to have very high directivity to complement the large attenuation characteristics, and for this reason, a horn antenna is emerging as an antenna that can be used in the millimeter wave band.

The horn antenna has an opening formed therein, and since the opening has the shape of a horn (trumpet), it is suitable for forming a beam having a directivity in a specific direction. However, a waveguide is generally used for feeding the horn antenna. The horn antenna requires a specific length due to the unique horn structure, and since the waveguide is also coupled to the horn antenna in the same direction as the horn antenna's length direction, the overall length of the horn antenna cannot but be increased, and the length of the horn antenna inevitably imposes considerable limitations when mounting the horn antenna on a product to be used.

In addition, since the waveguide is an expensive device and has a heavy weight, there was a problem in that a lot of cost is required when feeding the horn antenna using a waveguide and weight lightening could not be achieved.

SUMMARY

An object of the present disclosure is to propose a horn antenna suitable for miniaturization because the overall length of the horn antenna can be reduced by feeding the horn antenna using a PCB.

Another object of the present disclosure is to propose a horn antenna capable of forming a beam in a direction parallel to a PCB.

According to one aspect of the present disclosure, conceived to achieve the objectives above, a horn antenna for a millimeter wave is provided, the horn antenna comprising: a horn radiator including a radiation part having an opening formed therein to radiate a feed signal, and a multi-layer PCB coupling part coupled to lower and side portions of the radiation part to provide a feed signal; and a multi-layer PCB coupled to a lower portion of the multi-layer PCB coupling part to provide a feed signal, wherein a slot and a groove connected to the slot and extending in a direction parallel to the multi-layer PCB are formed in the multi-layer PCB coupling part, wherein a feed line vertically overlapping the slot and the groove is formed on a first layer substrate, which is the uppermost layer of the multi-layer PCB, wherein the opening extends in a direction parallel to the multi-layer PCB, and wherein a '¬'-shaped waveguide extending from the slot is formed in the horn radiator part.

A patch is formed at an end of the feed line, and the patch is arranged to vertically overlap the slot.

A first ground plane is formed on the first layer substrate, a first slot region is formed on the first ground plane, and the feed line is disposed in the first slot region.

A second layer substrate is coupled to the lower portion of the first layer substrate, a second ground plane is formed on the second layer substrate, a second slot region is formed on the second ground plane, a matching patch is disposed in the second slot region, and the matching patch is disposed to vertically overlap the patch.

A plurality of via holes are formed through the first layer substrate and the second layer substrate, and the plurality of via holes connect the first ground plane and the second ground plane and are disposed along a boundary surface of the first slot region.

A third layer substrate is coupled to a lower portion of the second layer substrate, a third ground plane is formed on an upper portion or a lower portion of the third layer substrate, and the plurality of via holes extend to the third ground plane.

According to another aspect of the present disclosure, conceived to achieve the objectives above, a horn antenna for a millimeter wave is provided, the horn antenna comprising: a horn radiator including a radiation part having an opening formed therein to radiate a feed signal, and a multi-layer PCB coupling part coupled to lower and side portions of the radiation part to provide a feed signal; and a multi-layer PCB coupled to a lower portion of the multi-layer PCB coupling part to provide a feed signal, wherein a slot is formed in the multi-layer PCB coupling part, wherein a feed line is formed on a first layer substrate, which is the uppermost layer of the multi-layer PCB, wherein a patch is formed at an end of the feed line, wherein the patch is formed to vertically overlap the slot, wherein the opening extends in a direction parallel to the multi-layer PCB, and wherein a '¬'-shaped waveguide extending from the slot is formed in the horn radiator part.

According to the present disclosure, by feeding the horn antenna using a PCB, the overall length of the horn antenna can be reduced, which is suitable for miniaturization, and it has the advantage of being able to form a beam in a direction parallel to the PCB.

DETAILED DESCRIPTION OF THE INVENTION

Figure 1:
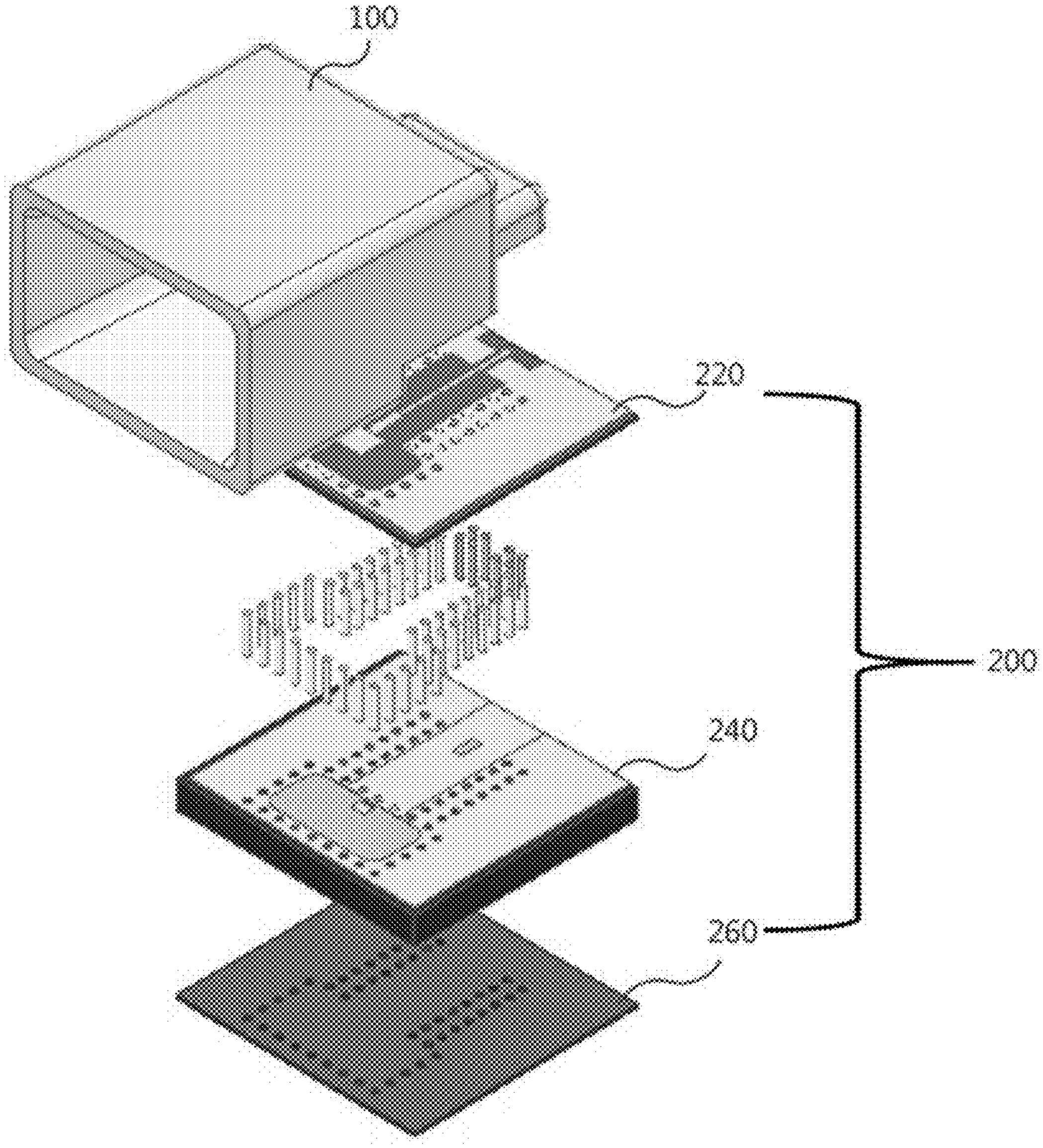
FIG. 1 shows an exploded perspective view of a horn antenna for a millimeter wave according to an embodiment of the present disclosure viewed from a first direction.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
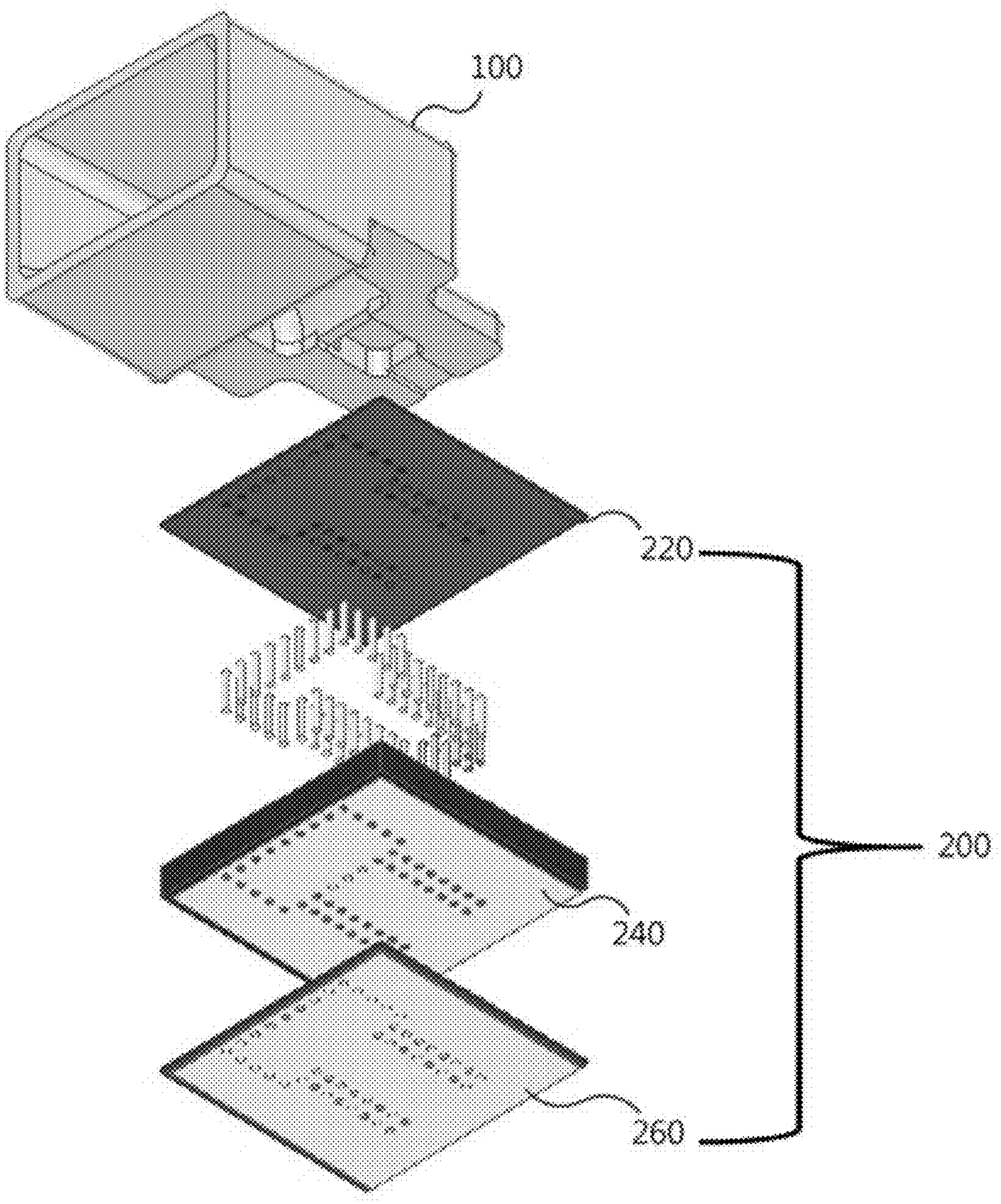
FIG. 2 shows an exploded perspective view of a horn antenna for a millimeter wave viewed from a second direction according to an embodiment of the present disclosure.
Figure 3:
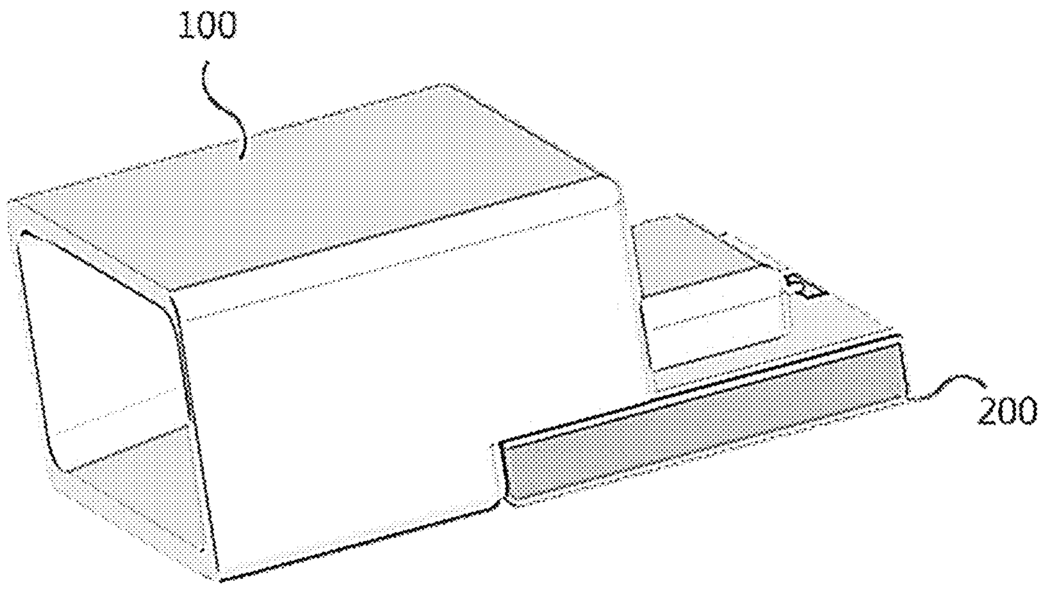
FIG. 3 shows a perspective view of a horn antenna for a millimeter wave according to an embodiment of the present disclosure.

FIG. 1 shows an exploded perspective view of a horn antenna for a millimeter wave according to an embodiment of the present disclosure viewed from a first direction, FIG. 2 shows an exploded perspective view of a horn antenna for a millimeter wave viewed from a second direction according to an embodiment of the present disclosure, and FIG. 3 shows a perspective view of a horn antenna for a millimeter wave according to an embodiment of the present disclosure.

Referring to FIGS. 1 to 3, a horn antenna for a millimeter wave according to an embodiment of the present disclosure includes a horn radiator 100 and a multi-layer PCB 200.

The multi-layer PCB 200 is disposed on a lower portion of the horn radiator 100, and the multi-layer PCB 200 is composed of three layers: a first layer substrate 220, a second layer substrate 240, and a third layer substrate 260.

The multi-layer PCB 200 serves to provide a feed signal to the horn radiator 100. In general, the horn radiator 100 of the horn antenna is fed using a waveguide. As mentioned in the description of the related art, since the waveguide is bulky and has a predetermined length, and is coupled in the same direction as the longitudinal direction of the horn radiator 100, the overall length of the horn antenna cannot but be increased.

The horn radiator 100 shown in FIGS. 1 to 3 is a radiator designed to radiate a beam in a direction parallel to a substrate (multi-layer PCB). When such a horn radiator 100 receives a feed signal through a waveguide, the horn radiator must have a long length. In order to solve the problem that the horn radiator is elongated in a certain direction, a feed signal is provided to the horn radiator 100 using the multi-layer PCB 200, and the multi-layer PCB 200 is coupled to a lower portion of the horn radiator 100. Due to such a coupling structure, it can be implemented in a smaller size than a conventional horn antenna.

Transmission of a feed signal in the multi-layer PCB 200 is performed in a manner similar to a waveguide, and a structure of each layer of the multi-layer PCB for transmission of a feed signal will be described with reference to separate drawings.

The horn radiator 100 serves to receive and radiate a feed signal from the multi-layer PCB 200. An opening is formed inside the horn radiator 100, and the opening formed inside the horn radiator has a structure in which the width gradually widens. The horn radiator 100 radiates a beam having a directivity in a specific direction through the formed opening, and is particularly suitable for a millimeter wave band requiring high gain.

Since the horn radiator 100 of the present disclosure is combined with the multi-layer PCB 200 instead of a waveguide, the structure of the horn radiator 100 is different from that of the existing radiator. Hereinafter, the structure of the horn radiator 100 will be described with reference to FIGS. 2 and 3.

Figure 4:
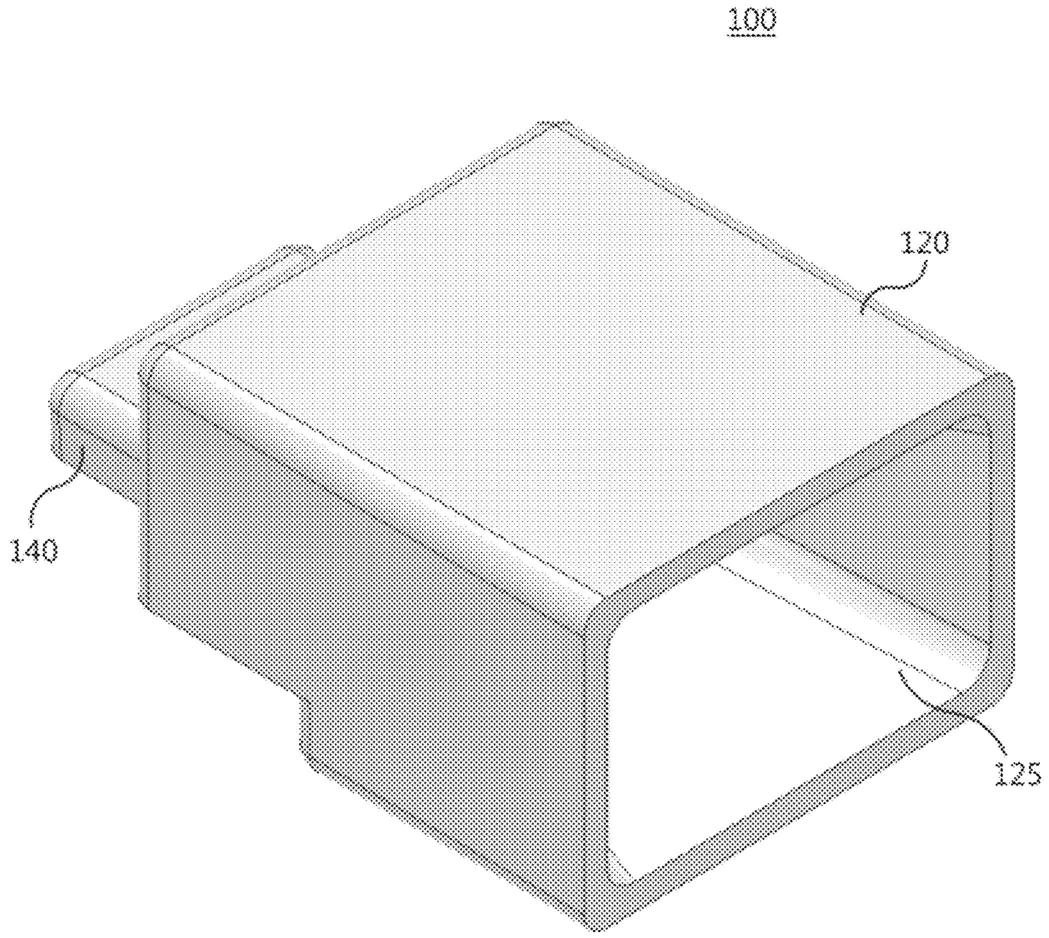
FIG. 4 shows a perspective view of a horn radiator viewed from above according to an embodiment of the present disclosure.
Figure 5:
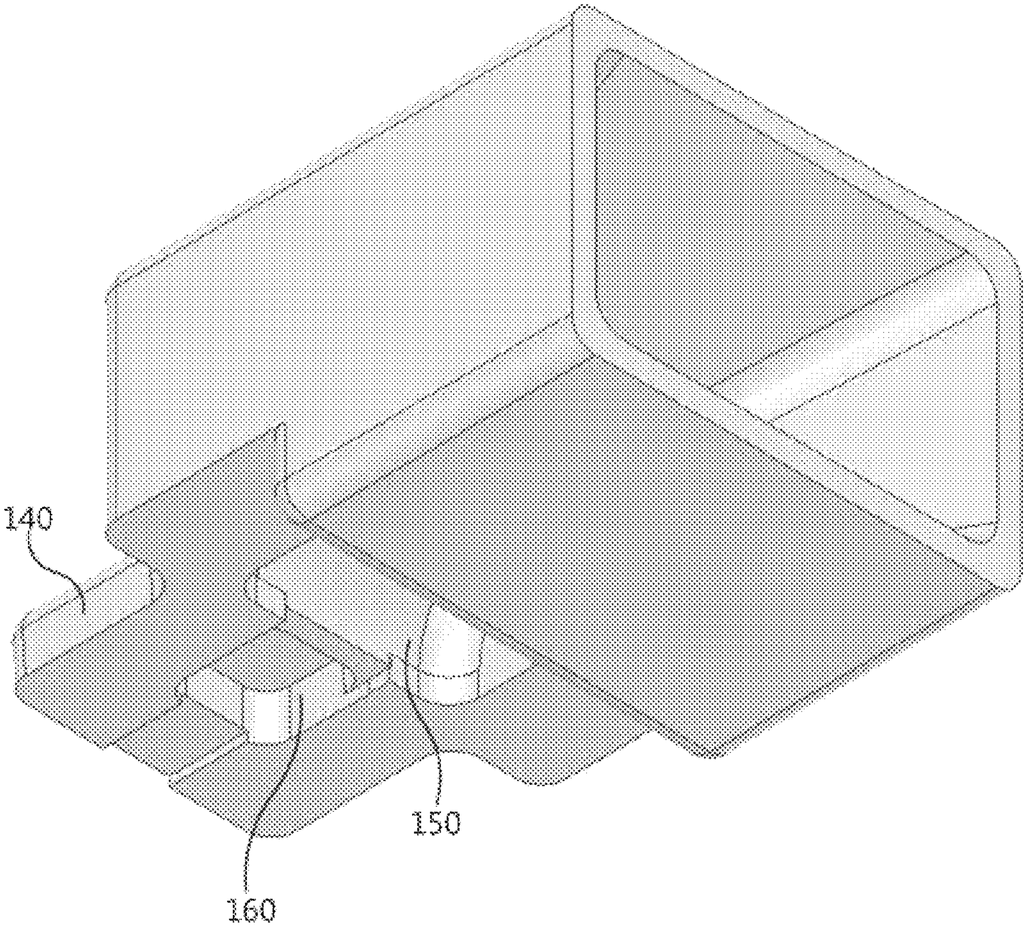
FIG. 5 shows a perspective view of a horn radiator viewed from the bottom according to an embodiment of the present disclosure.

FIG. 4 shows a perspective view of a horn radiator viewed from above according to an embodiment of the present disclosure, and FIG. 5 shows a perspective view of a horn radiator viewed from the bottom according to an embodiment of the present disclosure.

Referring to FIGS. 4 and 5, the horn radiator 100 according to an embodiment of the present disclosure includes a radiation part 120 and a multi-layer PCB coupling part 140.

The multi-layer PCB coupling part 140 is coupled to the multi-layer PCB 200 and provides a feed signal provided from the multi-layer PCB to the radiation part 120. The radiation part 120 radiates the feed signal provided through the multi-layer PCB coupling part 140 to the outside.

An opening 125 is formed in the radiation part 120, and a feed signal is radiated to the outside through the formed opening 125. Preferably, the opening 125 formed inside the radiation part has a structure in which the cross-sectional area gradually increases as the distance from the multi-layer PCB coupling part 140 increases. The area of the opening may increase continuously, or may increase discontinuously while having a stair structure. The extent to which the area of the opening increases may be determined based on required characteristics. It will be apparent to those skilled in the art that it can function as a horn radiator even if the area of the opening does not gradually increase, as needed.

The radiation part 120 has a predetermined length, and the length of the radiation part 120 may be determined by a used frequency band. When a high frequency is used, the length of the radiation part 120 is set relatively short, and when a low frequency is used, the length of the radiation part 120 is set relatively long. The area of the opening 125 is also determined by the used frequency band.

With the feed signal propagating and resonating through the radiation part 120, radiation to the outside results, and since the size of the opening 125 is limited, radiation of a beam concentrated in a specific direction is possible.

Referring to FIG. 4, the multi-layer PCB coupling part 140 is formed on a lower portion and a side portion of the radiation part 120. The multi-layer PCB coupling part 140 together with the multi-layer PCB 200 functions as one waveguide.

Referring to FIG. 5, the multi-layer PCB coupling part 140 includes a slot 150 and a groove 160. The slot 150 serves as a passage through which a feed signal provided from the multi-layer PCB 200 is provided to the radiation part 120. According to an embodiment of the present disclosure, the cross section of the slot 150 may have a rectangular shape, and rounded structures may be formed at corners of the rectangle if necessary. The area of the slot is set smaller than the area of the end of the opening 125.

The groove 160 is formed in connection with the slot, and is formed in a direction parallel to the longitudinal direction of the radiation part 120. The slot 150 serves to pass a feed signal, and the groove 160 serves to shield a metal pattern formed on the multi-layer PCB.

As will be described later, the feed signal is transmitted in the groove 160 area, and the groove 160 is formed to guide the transmitted signal. Since the slot 150 and the groove 160 are formed by being connected, the slot 150 and the groove 160 form a T'-shaped structure.

Areas of the multi-layer PCB coupling part 140 excluding the slot 150 and the groove 160 contact and are coupled to the multi-layer PCB 200.

As described above, the multi-layer PCB 200 is composed of three layers and, together with the multi-layer PCB coupling part 140, functions as a waveguide for guiding a feed signal. In this embodiment, a case is described in which the multi-layer PCB 200 consists of three layers, but it will be apparent to those skilled in the art that the number of layers of the multi-layer PCB 200 can be changed as needed.

Figure 6:
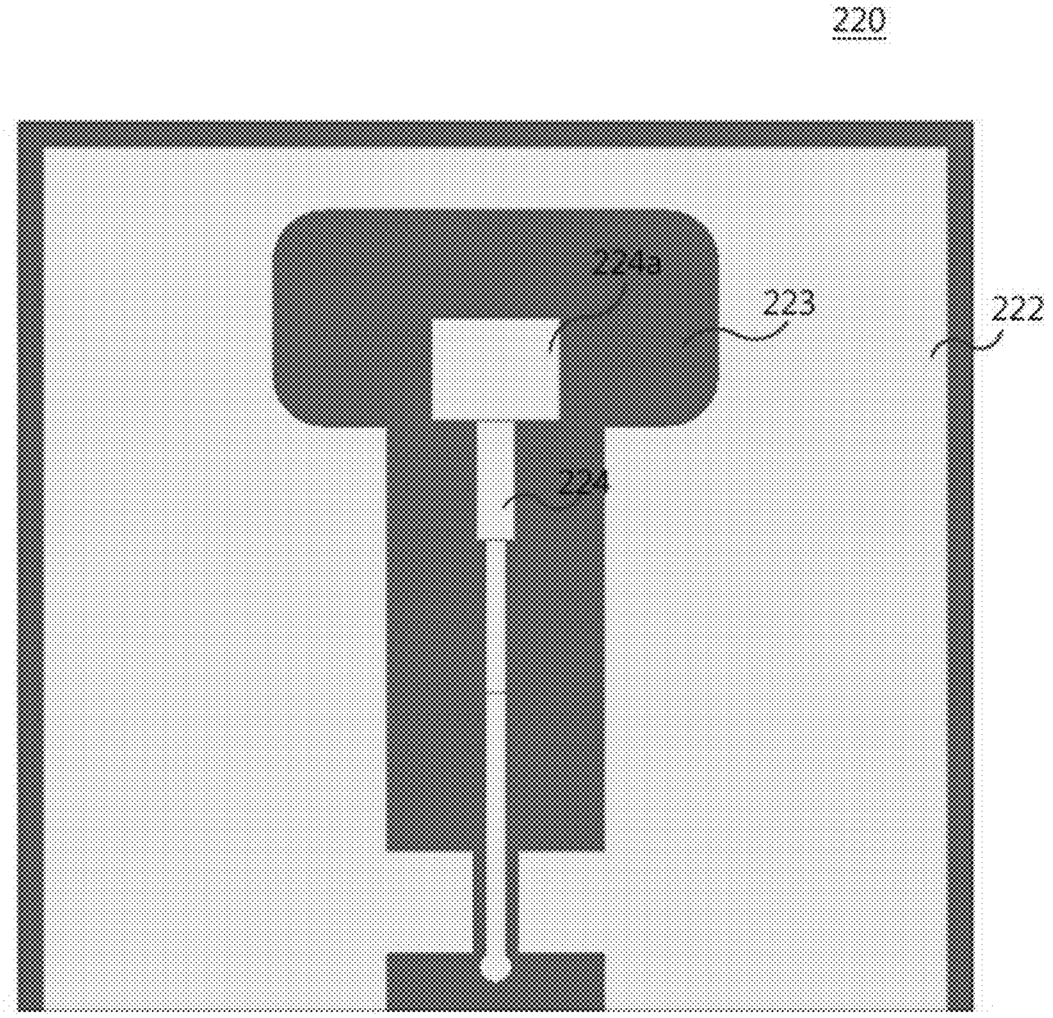
FIG. 6 shows a structure of a first layer substrate, which is the uppermost layer in a multi-layer PCB according to an embodiment of the present disclosure.

FIG. 6 shows a structure of a first layer substrate, which is the uppermost layer in a multi-layer PCB according to an embodiment of the present disclosure.

Referring to FIG. 6, a first ground plane 222 and a feed line 224 are formed on the first layer substrate 220 according to an embodiment of the present disclosure.

The feed line 224 is formed to have a predetermined length, and the longitudinal direction of the feed line 224 is parallel to the longitudinal direction of the radiation part 120 of the horn radiator 100. The first end of the feed line 224 is coupled to a connector or transmission line as a feed point. A patch **224*a* having a relatively large area compared to other portions is formed at the second end of the feed line 224**.

The feed line 224 is formed to vertically overlap the slot 150 and the groove 160 of the multi-layer PCB coupling part 140.

The patch **224*a* of the feed line 224 is formed corresponding to the position of the slot 150 formed in the multi-layer PCB coupling part 140 of the horn radiator 100 described above. The feed signal is provided to the radiation part 120 through the slot from the patch 224*a*. Preferably, the patch 224*a* is arranged to overlap the slot 150** vertically.

The first ground plane 222 is formed to entirely surround the feed line 224, and the first ground plane 222 and the feed line 224 are electrically separated from each other.

In order to electrically separate the first ground plane 222 and the feed line 224, a first slot region 223 is formed on the first ground plane 222, and a feed line 224 is formed in the first slot region 223. It is preferable that, as shown in FIG. 5, the width of the first slot region 223 is narrow in the narrow portion of the feed line 224, and the width of the first slot region 223 is wide in the wide patch portion of the feed line 224. The first ground plane 222 provides a ground potential for transmission of a feed signal.

Meanwhile, although not shown in the plan view of FIG. 6, via holes 300 (shown in FIGS. 7 and 8) are formed under the first ground plane 222 of the first layer substrate 220, and the via holes extend from the first layer substrate 220 to the third layer substrate 260.

Figure 7:
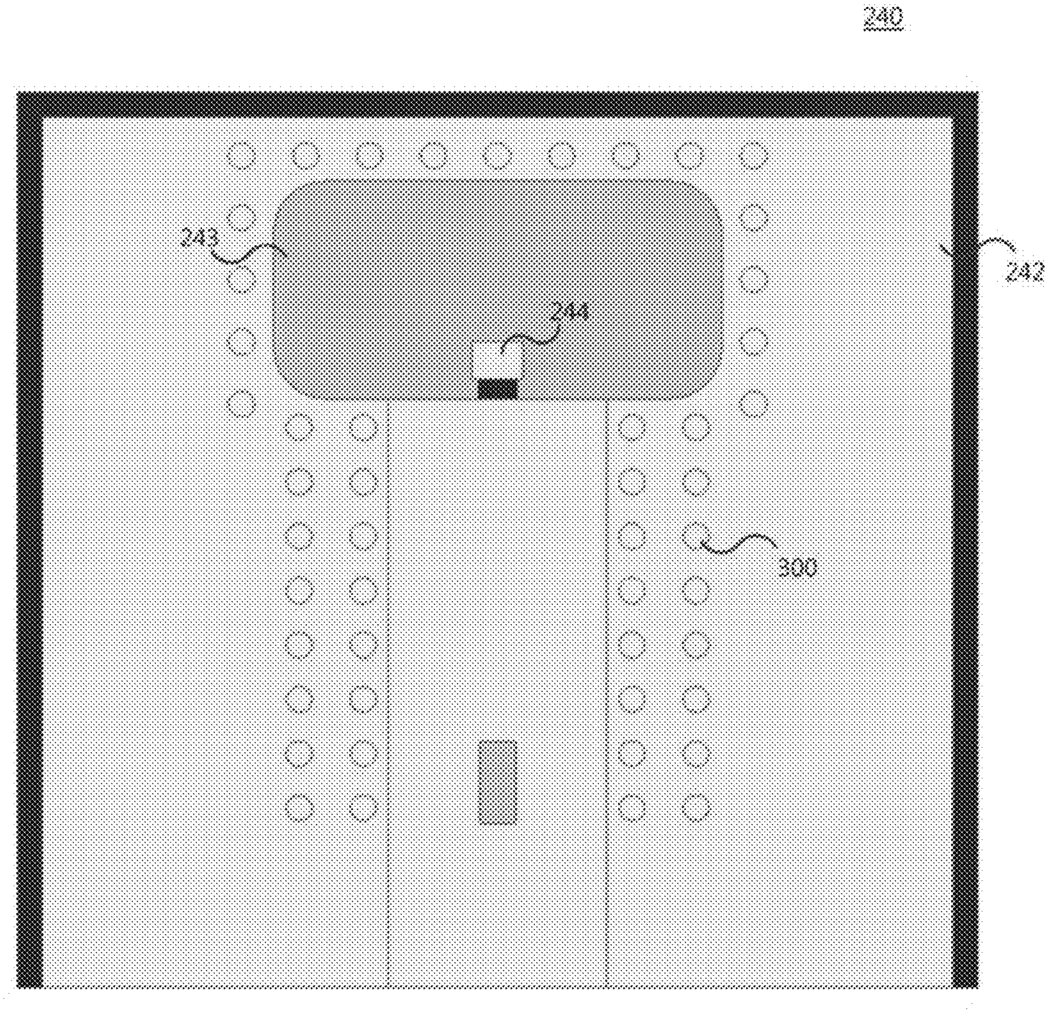
FIG. 7 shows a structure of a second layer substrate which is an intermediate layer in a multi-layer PCB according to an embodiment of the present disclosure.

FIG. 7 shows a structure of a second layer substrate which is an intermediate layer in a multi-layer PCB according to an embodiment of the present disclosure.

A second ground plane 242 is formed on the second layer substrate 240. The second ground plane 242 has a ground potential that is the same potential as that of the first ground plane 222. The second ground plane 242 is formed throughout the second layer substrate 240. A second slot region 243 is formed in a partial area of the second ground plane 242. The second slot region 243 is a region in which a portion of the second ground plane 242 is removed.

A matching patch 244 is formed in the second slot region 243. Since the matching patch 244 is formed in the second slot region 243, the matching patch 244 is electrically spaced apart from the second ground plane 242. The matching patch 244 is not even connected to a separate signal line.

The matching patch 244 is formed to vertically overlap the patch **224*a* formed on the first layer substrate 220. The matching patch 244 is formed to minimize the loss of the feed signal by matching the impedance when the patch 224*a* provides the feed signal through the slot 150**.

A plurality of via holes 300 are formed in the second layer substrate 240. The plurality of via holes 300 electrically connect the first ground plane 222 and the second ground plane 242. According to a preferred embodiment of the present disclosure, a plurality of via holes 300 are formed along the edge of the second slot region 243 of the second layer substrate 240. In addition, according to a preferred embodiment of the present disclosure, a plurality of via holes may be formed from the first layer substrate 220 through the third layer substrate 260.

As shown in FIG. 7, the plurality of via holes 300 may be formed while forming two rows of via holes 300 in a specific portion. The number of rows of via holes 300 may be variously changed, and may be formed as a single row or formed as two or more rows.

Figure 8:
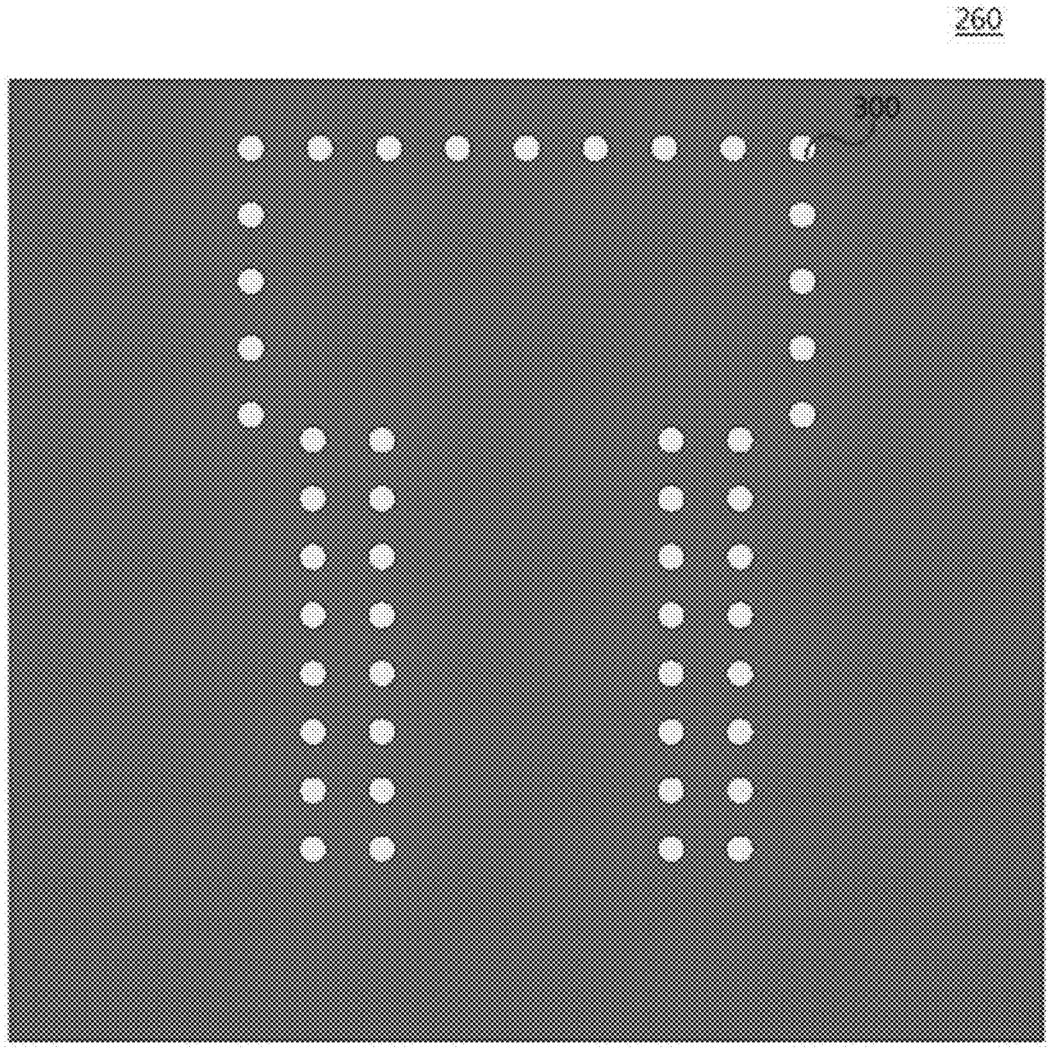
FIG. 8 shows a structure of a third layer substrate, which is the lowest layer in a multi-layer PCB according to an embodiment of the present disclosure.

FIG. 8 shows a structure of a third layer substrate, which is the lowest layer in a multi-layer PCB according to an embodiment of the present disclosure.

Referring to FIG. 8, a plurality of via holes 300 are formed in the third layer substrate 260. A separate metal pattern is not formed on the upper portion of the third layer substrate 260, but a third ground plane (not shown in FIG. 7) may be formed on the lower portion of the third layer substrate 260. Of course, the third ground plane may be formed on the upper portion of the third layer substrate 260. As described above, since the plurality of via holes 300 are formed to pass through the first layer substrate 220 to the third layer substrate 260, the first ground plane 222, the second ground plane 242 and the third ground plane are electrically connected through the via holes 300.

For example, via pins are inserted into the plurality of via holes 300 so that the first layer substrate 220, the second layer substrate 240 and the third layer substrate 260 have a structure similar to that of a waveguide, so that signal transmission in the feed line 224 of the first layer substrate 220 is performed while having the same characteristics as a waveguide. The via pin inserted into each via hole 300 plays the same role as a sidewall of the waveguide. Of course, the inner surface of the via hole 300 may be plated to serve as the side wall of the via hole.

Figure 9:
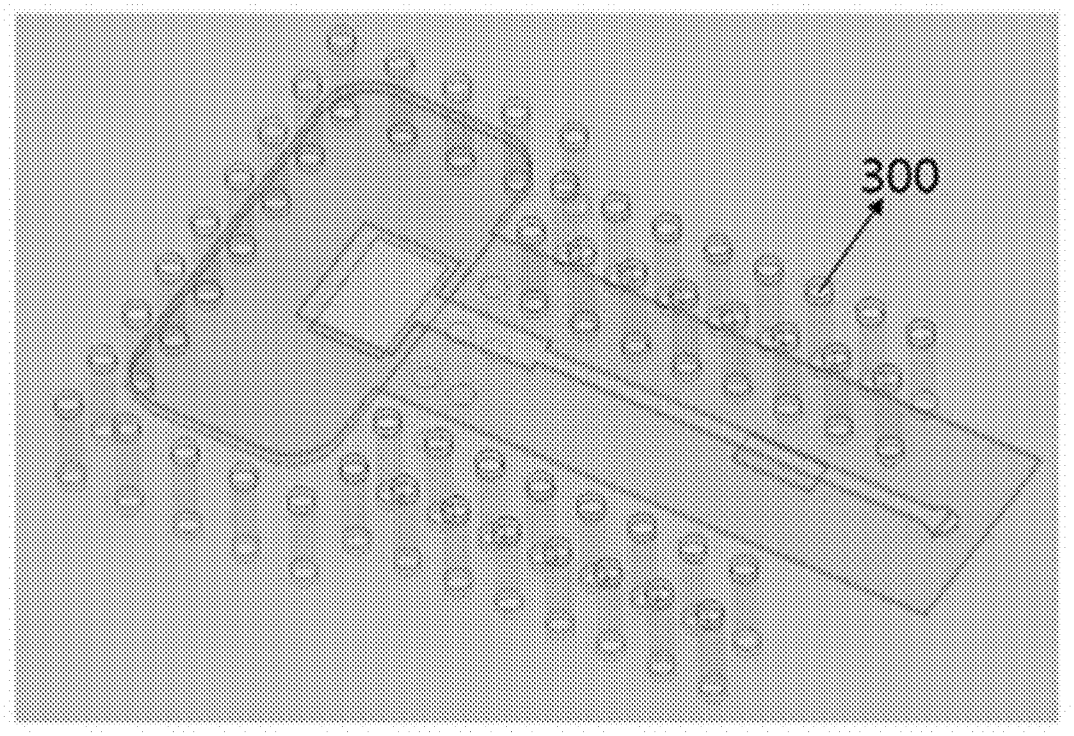
FIG. 9 shows a three-dimensional view of via hole structures of the first layer substrate, the second layer substrate and the third layer substrate according to the present disclosure.

FIG. 9 shows a three-dimensional view of via hole structures of the first layer substrate, the second layer substrate and the third layer substrate according to the present disclosure.

As shown in FIG. 9, the via holes 300 are formed from the first layer substrate 220 to the third layer substrate 260 so that the multi-layer PCB 200 functions as a waveguide.

Figure 10:
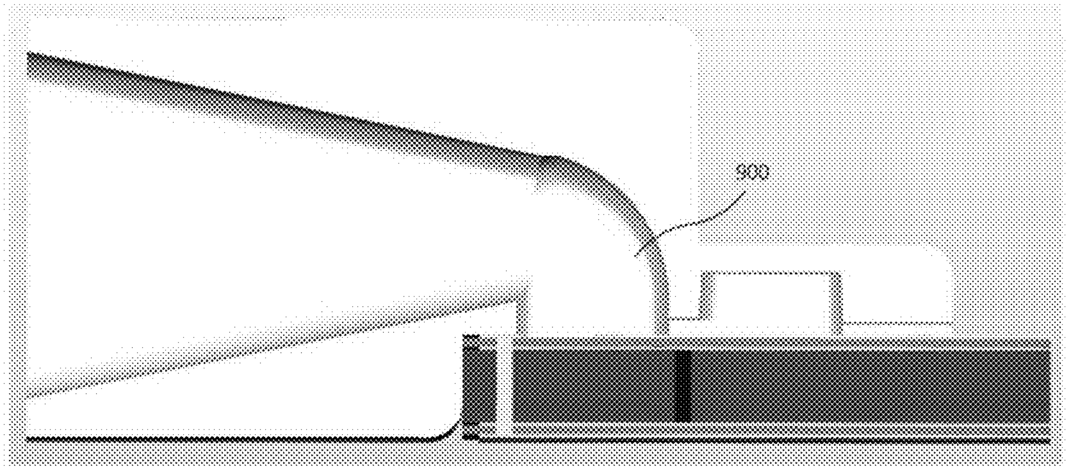
FIG. 10 shows a cross-sectional view of a horn radiator in a horn antenna for a millimeter wave according to an embodiment of the present disclosure.

FIG. 10 shows a cross-sectional view of a horn radiator in a horn antenna for a millimeter wave according to an embodiment of the present disclosure.

Referring to FIG. 10, a waveguide 900 is formed in the horn radiator of the horn antenna for a millimeter wave according to an embodiment of the present disclosure. The waveguide 900 functions to provide a feed signal provided from the feed line 224 of the multi-layer PCB 200 to the radiation part 120.

Since the horn antenna for a millimeter wave according to an embodiment of the present disclosure is an antenna set to radiate in a horizontal direction (a direction parallel to a multi-layer PCB), the waveguide has an '¬' shape in its cross section.

The first end of the waveguide is the slot 150 of the multi-layer PCB coupling part 140, and the second end of the waveguide is a slot formed at the starting point of the opening 125. It will be apparent to those skilled in the art that the bending point in the '¬' shape of the waveguide may have a rounded structure, and various structures modified from the '¬' shape can be applied.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A horn antenna for a millimeter wave, the horn antenna comprising:

a horn radiator including a radiation part having an opening formed therein to radiate a feed signal, and a multi-layer PCB coupling part coupled to lower and side portions of the radiation part to provide a feed signal; and a multi-layer PCB coupled to a lower portion of the multi-layer PCB coupling part to provide a feed signal, wherein a slot and a groove connected to the slot and extending in a direction parallel to the multi-layer PCB are formed in the multi-layer PCB coupling part, wherein a feed line vertically overlapping the slot and the groove is formed on a first layer substrate, which is the uppermost layer of the multi-layer PCB, wherein the opening extends in a direction parallel to the multi-layer PCB, and wherein a '¬'-shaped waveguide extending from the slot is formed in the horn radiator, wherein a patch is formed at an end of the feed line, and the patch is arranged to vertically overlap the slot, wherein a first ground plane is formed on the first layer substrate, a first slot region is formed on the first ground plane, and the feed line is disposed in the first slot region, and wherein a second layer substrate is coupled to a lower portion of the first layer substrate, a second ground plane is formed on the second layer substrate, a second slot region is formed on the second ground plane, a matching patch is disposed in the second slot region, and the matching patch is disposed to vertically overlap the patch.

2. The horn antenna for a millimeter wave according to claim 1, wherein a plurality of via holes are formed through the first layer substrate and the second layer substrate, and the plurality of via holes connect the first ground plane and the second ground plane and are disposed along a boundary surface of the first slot region.

3. The horn antenna for a millimeter wave according to claim 2, wherein a third layer substrate is coupled to a lower portion of the second layer substrate, a third ground plane is formed on an upper portion or a lower portion of the third layer substrate, and the plurality of via holes extend to the third ground plane.

* * * * *